United States Patent [19]

Tateishi

[11] Patent Number: 5,304,941
[45] Date of Patent: Apr. 19, 1994

[54] SENSOR DETECTION SIGNAL EXTRACTING CIRCUIT WITH OFFSET VOLTAGE CANCELLING ABILITY

[75] Inventor: Tetuo Tateishi, Kariya, Japan

[73] Assignee: Kabushiki Kaisha Toyoda Jidoshokki Seisakusho, Kariya, Japan

[21] Appl. No.: 1,794

[22] Filed: Jan. 8, 1993

[30] Foreign Application Priority Data

Jan. 8, 1992 [JP] Japan .................................. 4-001780

[51] Int. Cl.⁵ .............................................. H03F 1/32
[52] U.S. Cl. .................................... 328/164; 307/308; 307/359; 330/290; 330/97; 328/162; 328/173
[58] Field of Search ............... 307/262, 308, 359, 362, 307/520; 328/165, 162, 164; 330/9, 97, 110, 290

[56] References Cited

U.S. PATENT DOCUMENTS

| | | | |
|---|---|---|---|
| 3,550,013 | 1/1969 | Gurol | 307/308 |
| 3,737,790 | 6/1973 | Brown | 328/165 |
| 3,758,868 | 9/1973 | Brown | 328/165 |
| 3,778,710 | 12/1973 | Snook | 330/9 |
| 3,784,848 | 1/1974 | Hamilton, II | 328/162 |
| 3,965,429 | 6/1976 | Roberts, III | 307/308 |

Primary Examiner—William L. Sikes
Assistant Examiner—Shawn Riley
Attorney, Agent, or Firm—Brooks Haidt Haffner & Delahunty

[57] ABSTRACT

A sensor detection signal extracting circuit comprises a sensor, a control voltage generator, an adder, an amplifier, and a low-pass filter. The control voltage generator comprises two input terminals to one of which a voltage is applied based on the voltage source of the sensor. The output of the control voltage generator is added to the output of the sensor by the adder. The output of the adder is amplified by the amplifier, and its output is outputted to the output terminal and applied to the other input terminal of the control voltage generator through the low-pass filter. As a result, two loop systems are formed, that is, one loop for offsetting the change in the voltage of a voltage source applied to the sensor, and the other loop for offsetting a low frequency change such as that due to change in the environmental temperature. Therefore, the true output of the sensor can be obtained at the output terminal with little effect by the voltage change of the voltage source or by change in temperature.

5 Claims, 3 Drawing Sheets

SENSOR DETECTION SIGNAL EXTRACTING CIRCUIT WITH OFFSET VOLTAGE CANCELLING ABILITY

BACKGROUND OF THE INVENTION

The present invention relates to sensor detection signal extracting circuit, and more specifically to a circuit capable of exactly detecting the level of change in pressure by using a bridge circuit type sensor.

When a change in a physical quantity such as pressure, etc. is electrically detected by using a bridge-type sensor, a bridge circuit adjusts the balanced state with no pressure applied to the sensor, when pressure for example should be detected, and then tries to balance the output from the sensor at "0". However, due to the change in environmental temperature, it is hard for the bridge circuit to retain a balanced state even if the balanced state at "0" can be attained for a brief moment. As a result, an excess voltage is generated in the bridge circuit. Since the value of the excess voltage changes according to the voltage variation in the sensor's operational voltage source, the state of the sensor balanced at "0" cannot be retained for a long time. The unnecessary voltage generated at the output of the sensor is referred to as an "offset voltage".

Since the offset voltage is not necessary, it should be deleted, but by an effective circuit configuration.

An effective circuit should be designed to offset the above described offset voltage through feedback technology so that only the true output of the sensor, which changes according to a change in the physical quantity such as pressure, etc., can be obtained as the output of an amplifier.

FIG. 1 shows a circuit for explaining the configuration of the principle of a sensor detection signal, i.e. a sensor signal extracting circuit of the prior art technology. In FIG. 1, an appropriate voltage is applied to a sensor 1 used in the sensor detection signal extracting circuit. The sensor 1 is a bridge circuit type, and the balanced state is carefully retained as described above, though with an offset voltage generated. Therefore, the true sensor output determined depending on the change in the physical quantity such as pressure, etc. is outputted as superposed onto the offset voltage. The output of the sensor is applied to one input terminal of an adder 3. The output of the adder 3 is applied to the input terminal of amplifier $G_1$. Then, the output of the sensor 1 is amplified by amplifier $G_1$. The amplified signal is outputted to an output terminal Out, and applied to an integrator 4 functioning as a low-pass filter.

The integrator 4 is provided with operational amplifier $A_1$, and the output of amplifier $G_1$ is applied to the inverted input terminal (−) of operational amplifier $A_1$ through resistor $R_1$. The output of operational amplifier $A_1$ is applied to the other input terminal of the adder 3, and fed back to the inverted input terminal (−) of operational amplifier $A_1$ through capacitor $C_1$. The cut-off frequency of the integrator 4 depends on the values of resistor $R_1$ and capacitor $C_1$. The cut-off frequency is set to a value a little lower than the minimum frequency of the frequencies of the signals contained in the true sensor output determined depending on the change in the physical quantity such as pressure, etc. so that the true output of the sensor can be separated from the offset voltage.

Capacitor $C_1$ can be charged with a necessary voltage to eliminate the offset voltage outputted by the sensor 1. This voltage is applied to the adder 3 and added to the offset voltage outputted by the sensor 1. Hence, since this voltage applied from the integrator 4 to the adder 3 has a reversed polarity (equal in value but different in sign) to the voltage applied from the sensor 1 to the adder 3, they can be offset when added together by the adder 3, resulting in no offset voltage in the output of the adder 3. Therefore, only the true sensor output determined by the change in physical quantity such as pressure is outputted to the output terminal Out after being amplified to a predetermined level by amplifier $G_1$.

Since the sensor 1 outputs an inevitable offset voltage, the offset voltage changes according to the change in the voltage of the sensor's operational voltage source 2. If the frequency of the change in the offset voltage is lower than the cut-off frequency of the integrator 4, then the voltage charged to capacitor $C_1$ changes corresponding to the change in the offset voltage, thereby maintaining the capabilities of the sensor detection signal extracting circuit.

However, if the frequency of the change in the offset voltage is higher than the cut-off frequency of the integrator 4, then the change in the offset voltage can be controlled or removed by the operation of the integrator 4. Therefore, a voltage not reflecting the change in the offset voltage is applied to the adder 3 from the integrator 4. As a result, the offset voltage and the voltage outputted from the integrator 4 are not offset at the adder 3 to each other, resulting in the offset voltage remaining undesirably. Furthermore, since the residual voltage is amplified by amplifier $G_1$, it is outputted to the output terminal Out. Therefore, a true sensor output determined depending on the change in physical quantity such as pressure, etc. cannot be outputted to the output terminal Out by the conventional sensor detection signal extracting circuit. This inconvenience occurs when the frequency of the change in the offset voltage is higher than the cut-off frequency of the integrator 4. However, if the cut-off frequency of the integrator 4 is set to an excessively high value, then the true output of the sensor cannot be separated from the offset voltage, and furthermore, unnecessary signals generated independently of the voltage change of the sensor's operational voltage source 2, such as a change in the offset voltage caused by an impact signal induced externally to the sensor 1 and the circuit, cannot be successfully removed.

SUMMARY OF THE INVENTION

The present invention aims at providing a circuit capable of exactly detecting the degree of the change in pressure by using a bridge circuit type sensor.

Another object of the present invention is to provide the output of a sensor for the output terminal of the above described detection signal extracting circuit after actually eliminating an inevitable offset voltage generated in the sensor due to the change in the voltage of a sensor's operational voltage source, in the environmental temperature, etc.

A further object of the present invention is to prevent an unnecessary signal such as a harmful impact signal from being generated at the output terminal of the detection signal extracting circuit even if the voltage of the sensor's operational voltage source should change.

In the present invention, a specific circuit is provided to cancel without using the output of a low-pass filter, the change in the offset voltage generated by the voltage change in the sensor's operational voltage source. As a result, a detection signal extracting circuit free of the influence of the voltage change in the sensor's operational voltage source on a sensor output signal can be realized.

DETAIL DESCRIPTION OF DRAWINGS

Figure 1:
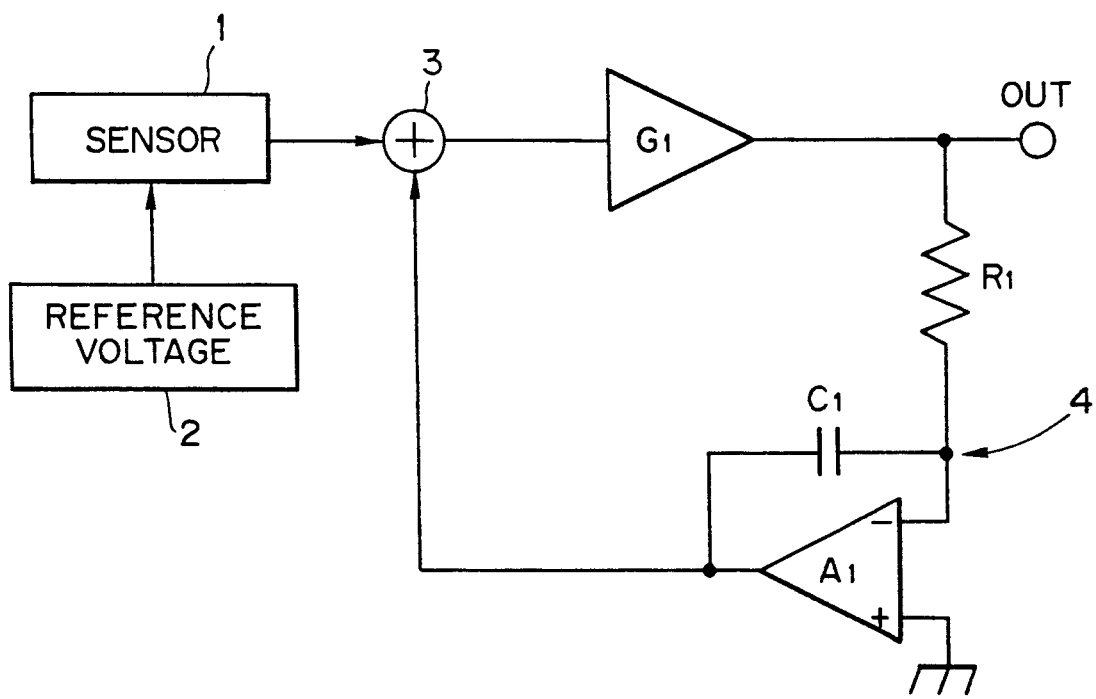
FIG. 1 shows a prior art sensor signal extracting circuit.
Figure 2:
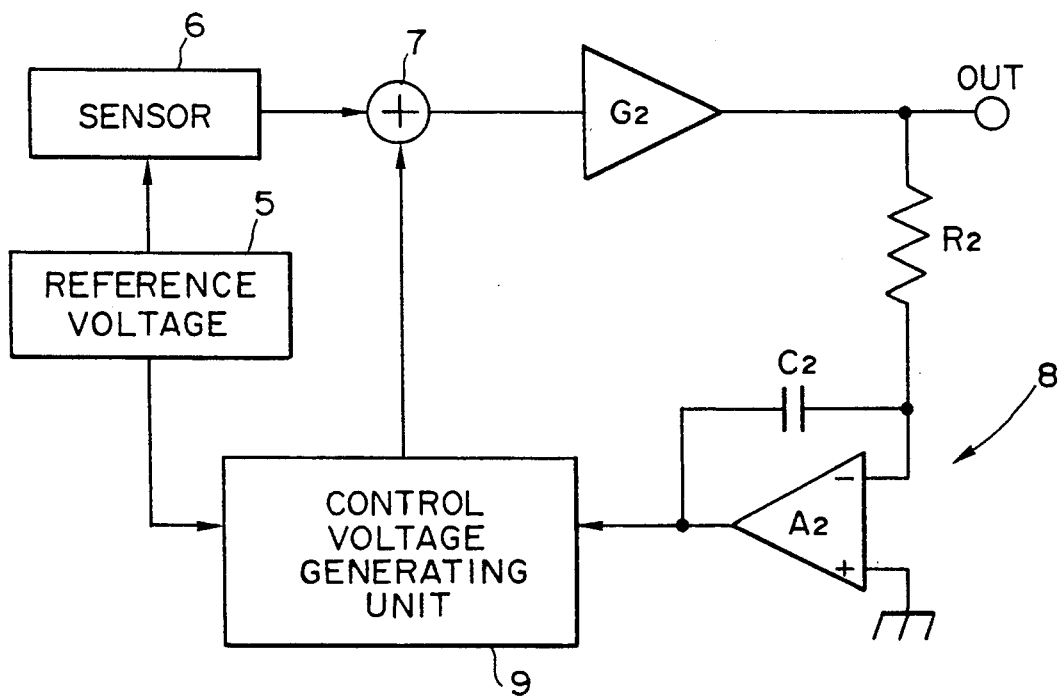
FIG. 2 shows a sensor detection signal extracting circuit of the present invention.

FIG. 2 shows a circuit for explaining the principle of the sensor detection signal extracting circuit of the present invention. In FIG. 2, a sensor's operational voltage source 5 applies an appropriate voltage to a sensor 6 and to one input terminal of a control voltage generator 9. The output of the control voltage generator 9 is applied to one input terminal of an adder 7. The output of sensor 6 is applied to the other input terminal of the adder 7. The output of the adder 7 is applied to the input terminal of amplifier $G_2$, and the output signal of amplifier $G_2$ is outputted to the output terminal Out and applied to the integrator 8.

The integrator 8 is provided with operational amplifier $A_2$ whose non-inverted input terminal (+) is connected to the ground. The output of amplifier $G_2$ is applied to the inverted input terminal (−) of operational amplifier $A_2$ through resistor $R_2$. The output of operational amplifier $A_2$ is applied to the other input terminal of the control voltage generator 9, and fed back to the inverted input terminal (−) of operational amplifier $A_2$ through capacitor $C_2$. Then, the cut-off frequency of the integrator 8 is determined according to the values of resistor $R_2$ and capacitor $C_2$, and the cut-off frequency is set to a frequency a little lower than the minimum frequency of the frequencies of the signal contained in the true sensor output determined depending on the change in physical quantity such as pressure, etc. Thus, the true output of the sensor can be successfully separated from the offset voltage.

The sensor detection signal extracting circuit having the above described configuration is explained below. When pressure to be detected is applied to the sensor 6, the sensor 6 outputs an output signal indicating the state of the offset voltage superposed by a detection signal. This signal is applied to amplifier $G_2$ through the adder 7, amplified by amplifier $G_2$, outputted to the output terminal Out, and applied to the integrator 8. The output of the sensor 6 and the output of the control voltage generator 9 are applied to the adder 7. The voltage outputted from the sensor's operational voltage source 5 and applied to the control voltage generator 9 is appropriately adjusted such that the output voltage of the control voltage generator 9 to be applied to the adder 7 is equal in value and different in sign from the offset voltage of the output from the sensor 6. As a result, the offset voltage is offset by the adder 7, and the adder 7 applies to amplifier $G_2$ an output free of the offset voltage. If the offset voltage changes according to the voltage change from the sensor's operational voltage source 5, then both input voltages of the adder 7 are changed by the same amount. Therefore, the output of the adder 7 maintains the state in which it does not indicate that change in the offset voltage which is caused by voltage fluctuation of the sensor's operational voltage source 5. Thus, the integrator 8 is not affected by the voltage change of the sensor's operational voltage source 5. On the other hand, if an offset voltage is generated at the output of the sensor 6 according to a physical change at a low frequency, then the integrator 8 operates to modify the output voltage according to the physical change. Then, the result is provided for the adder 7 through the control voltage generator 9. Accordingly, the output of the adder 7 can be free of offset voltages generated with physical changes such as temperature changes.

A more practical embodiment is explained below by referring to the drawings.

Figure 3:
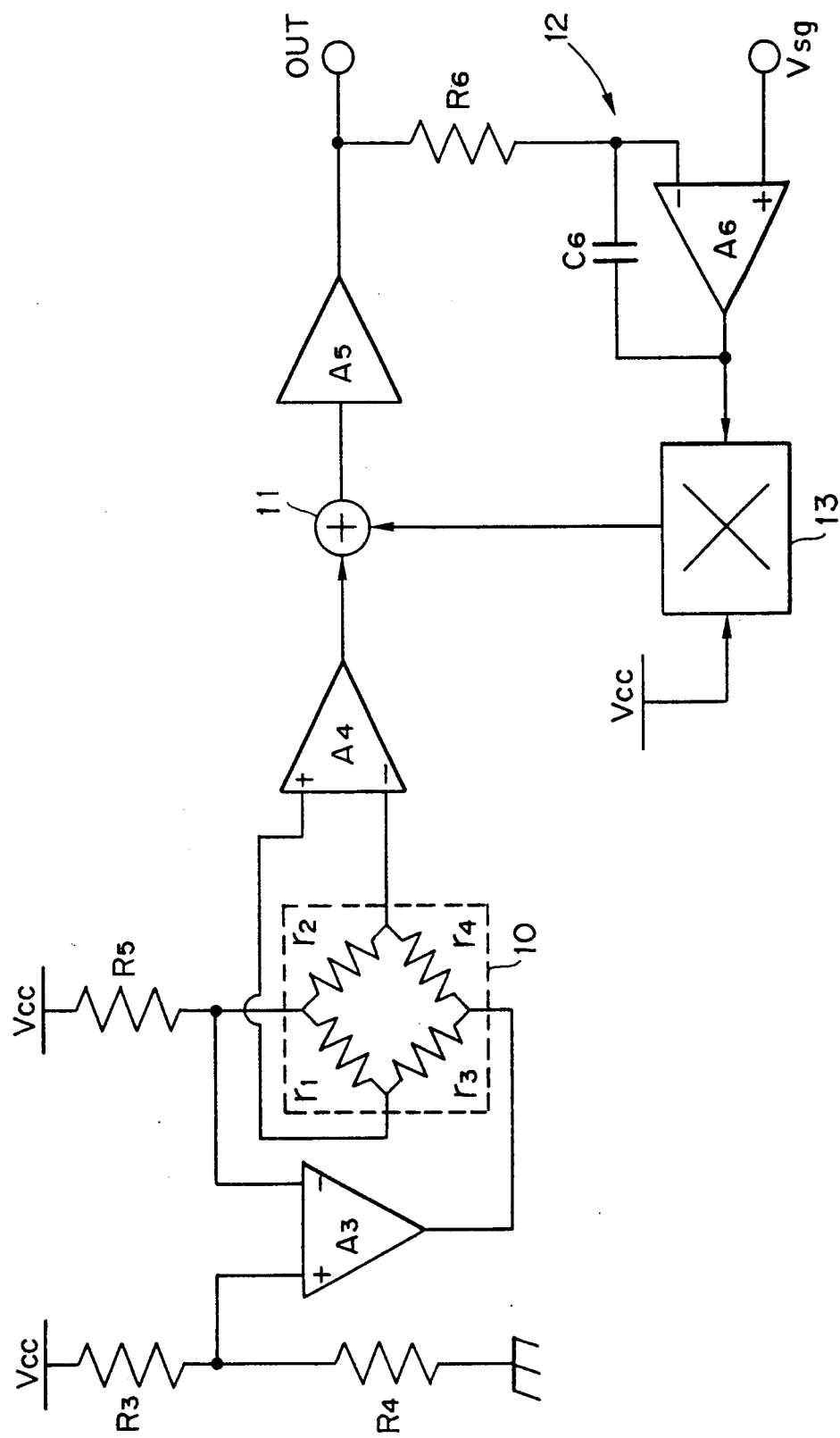
FIG. 3 shows an example circuit using the sensor detection circuit of the present invention.

FIG. 3 shows an example circuit for a sensor detection signal extracting circuit of the present invention. In FIG. 3, a sensor 10 comprises $r_1$, $r_2$, $r_3$, and $r_4$ forming a bridge circuit. These resistors, which change their resistance value when pressure, etc. is applied to them, form a strain gauge. Resistors $R_3$ and $R_4$ are connected in serial between the power source line for inducing power source voltage $V_{cc}$ and the ground, and the point connecting $R_3$ and $R_4$ is applied to the non-inverted input terminal (+) of operational amplifier $A_3$. One input terminal of the sensor 10 is connected to the power source line for inducing power source voltage $V_{cc}$ through resistor $R_5$, and also to the inverted input terminal (−) of operational amplifier $A_3$. The other input terminal of the sensor 10 is connected to the output terminal of operational amplifier $A_3$. With the above described configuration, power source voltage $V_{cc}$ is distributed to the sensor 10, and a fixed current flows through the sensor 10 according to the distributed voltage.

The output terminal of the sensor 10 is connected to the non-inverted input terminal (+) and the inverted input terminal (−) of operational amplifier $A_4$. The differential output of the sensor 10 is converted to a single output by operational amplifier $A_4$. The converted output is applied to the input terminal of an adder 11, and added to the output of the multiplier 13 by the adder 11. The output obtained by the addition by the adder 11 is applied to operational amplifier $A_5$, and operational amplifier $A_5$ amplifies the output to a predetermined level and outputs the result to the output terminal Out. The output of the output terminal Out is applied to an integrator 12. The integrator 12 is provided with operational amplifier $A_6$, and the output of operational amplifier $A_5$ is applied to its inverted input terminal (−) through resistor $R_6$. The output of operational amplifier $A_6$ is applied to one input terminal of multiplier 13, and fed back to the inverted input terminal (−) of operational amplifier $A_6$ through capacitor $C_6$. Capacitor $C_6$ is charged with appropriate voltage for offsetting the fluctuation of the offset voltage generated not by on the voltage fluctuation of power source voltage $V_{cc}$ but by other factors. A DC-driven voltage $V_{sg}$ for applying to an external unit an electric potential for determining a DC operation point when a sensor detection signal is outputted is applied to the non-inverted input terminal (+) of operational amplifier $A_6$.

Power source voltage $V_{cc}$ is applied to the other input terminal of the multiplier 13 for receiving the output of the integrator 12, and the size of the voltage to be outputted by the multiplier 13 is determined and applied to the other input terminal of the adder 11.

Thus, when pressure is applied to the sensor 10, the sensor 10 outputs an output signal indicating the state of the offset voltage superposed by a detecting signal. After the signal is converted to a single output by operational amplifier A$_4$, it is applied to operational amplifier through the adder 11, and then amplified by operational amplifier A$_5$, and then outputted to the output terminal Out, and applied to the integrator 12. The output of operational amplifier A$_4$ based on the output of the sensor 10 and the output of the multiplier 13 are applied to the adder 11. The voltage applied based on power source voltage V$_{cc}$ to the multiplier 13 is appropriately adjusted such that the output voltage of the multiplier 13 applied to the adder 11 is equal in value but different in sign to the offset value of the output of operational amplifier A$_4$. As a result, the offset voltage is offset by the adder 11, and the adder 11 applies to operational amplifier A$_5$ an output free of the offset voltage. If the offset voltage changes according to the voltage fluctuation of power source voltage V$_{cc}$, then both input voltages of the adder 11 change by the same amount. Therefore, the output of the adder 11 maintains the state in which it does not indicate that change in the offset voltage which is caused by voltage fluctuation of the power source voltage V$_{cc}$. Thus, the integrator 12 is not affected by a voltage change of the power source voltage V$_{cc}$. On the other hand, if an offset voltage is generated at the output of the sensor 10 according to a physical change at a low frequency, then the integrator 12 operates to modify the output voltage (the voltage is charged to capacitor C$_6$) according to the physical change. Then, the result is provided for the adder 11 through the multiplier 13. Accordingly, the output of the adder 11 can be free of the offset voltage generated by a physical change such as temperature change. Additionally, the operation of operational amplifiers A$_5$ and A$_6$ is operated so that no offset voltage can be generated from the sensor 10 (for example, when the non-inverted input terminal (+) of operational amplifier A$_3$ and the inverted input terminal (−) are short-circuited). It should be arranged such that the voltage charged to capacitor C$_6$ indicates "0".

The multiplier 13 can be configured as a combination of an operational amplifier and an FET, by using a specific IC, etc. Also, the multiplier 13 can comprise an additional adder. Furthermore, the integrator 12 can comprise a low-pass filter consisting of an active filter, a coil, and a capacitor.

As described above, according to the sensor detection signal extracting circuit of the present invention, a true output of a sensor can be outputted to the output terminal after actually eliminating the offset voltage of the sensor without being affected by the voltage fluctuation of the sensor's operational voltage source or by any factor other than the voltage fluctuation of the sensor's operational voltage source.

What is claimed is:

1. A sensor detection signal extracting circuit having a sensor to which a voltage is applied by a source of operating voltage, comprising:
   a control voltage generator having a first input terminal to which is coupled said source of operating voltage,
   an adder having a first adder input coupled to said sensor for receiving a signal from said sensor and having a second adder input coupled to an output of said control voltage generator, said adder having an output for outputting a sensor detection signal after offsetting with a signal from said control voltage generator an offset voltage in the output of said sensor,
   an amplifier coupled thereto for amplifying the output of said adder and for outputting an amplified signal to an output terminal, and
   a low-pass filter coupled for receiving said amplified signal from said output terminal and applying it to another input terminal of said control voltage generator.

2. The sensor detection signal extracting circuit according to claim 1, wherein
   said low-pass filter is an integrator.

3. The sensor detection signal extracting circuit according to claim 1, wherein
   said low-pass filter functions as an integrator by applying said signal from said output terminal to the inverted input terminal of an operational amplifier and applying the output of said operational amplifier to one input terminal of said control voltage generator while feeding it back to said inverted input terminal through a capacitor.

4. The sensor detection signal extracting circuit according to claim 1, wherein
   said control voltage generator is a multiplier coupled to receive said operating voltage from said source and to receive a signal from said low-pass filter, and to feed an output to said adder.

5. The sensor detection signal extracting circuit according to claim 1, wherein
   said source of operating voltage is power-source-dependent,
   said control voltage generator is a multiplier,
   said amplifier is an operational amplifier,
   said low-pass filter functions as an integrator by applying a signal from said output terminal to an inverted input terminal of a second operational amplifier through a resistor, and applying an output of said second operational amplifier to a second input terminal of said control voltage generator in addition to feeding it back to said inverted input terminal through a capacitor.

* * * * *